(12) United States Patent
DeWaard

(10) Patent No.: US 7,306,731 B1
(45) Date of Patent: Dec. 11, 2007

(54) MANURE SEPARATION FOR DIGESTER METHOD AND APPARATUS

(75) Inventor: Dave C DeWaard, Lynden, WA (US)

(73) Assignee: Daritech, Inc., Lynden, WA (US)

( * ) Notice: Subject to any disclaimer, the term of this patent is extended or adjusted under 35 U.S.C. 154(b) by 0 days.

(21) Appl. No.: 10/918,618

(22) Filed: Aug. 12, 2004

Related U.S. Application Data

(60) Provisional application No. 60/494,986, filed on Aug. 12, 2003.

(51) Int. Cl.
*C02F 9/02* (2006.01)

(52) U.S. Cl. .................. 210/607; 210/803; 210/805; 210/195.1

(58) Field of Classification Search ................ 210/800
See application file for complete search history.

(56) References Cited

U.S. PATENT DOCUMENTS

| | | | |
|---|---|---|---|
| 3,730,887 A | 5/1973 | Hidetomo et al. | |
| 3,736,111 A * | 5/1973 | Gardner et al. ............... | 48/111 |
| 3,736,120 A * | 5/1973 | Tempe ............................ | 71/9 |
| 3,761,237 A * | 9/1973 | Jeffreys ........................... | 71/9 |
| 3,773,659 A * | 11/1973 | Carlson et al. ............. | 210/606 |
| 3,982,499 A * | 9/1976 | Frankl ......................... | 119/450 |
| 4,121,539 A * | 10/1978 | Moore ......................... | 119/450 |
| 4,160,724 A | 7/1979 | Laughton | |
| 4,193,206 A | 3/1980 | Maffet | |
| 4,315,821 A | 2/1982 | Climenhage | |
| 4,460,470 A | 7/1984 | Reimann | |
| 5,098,572 A | 3/1992 | Faup et al. | |
| 5,290,451 A | 3/1994 | Koster et al. | |
| 5,472,472 A | 12/1995 | Northrop | |
| 5,531,898 A * | 7/1996 | Wickham .................... | 210/606 |
| 5,817,241 A * | 10/1998 | Brayboy ..................... | 210/800 |
| 5,885,461 A * | 3/1999 | Tetrault et al. ............. | 210/652 |
| 6,039,874 A * | 3/2000 | Teran et al. ................ | 210/605 |
| 6,077,548 A * | 6/2000 | Lasseur et al. ................ | 426/7 |
| 6,083,386 A * | 7/2000 | Lloyd ....................... | 210/195.1 |
| 6,136,185 A * | 10/2000 | Sheaffer ..................... | 210/153 |
| 6,190,566 B1 * | 2/2001 | Kolber ........................ | 210/744 |
| 6,193,889 B1 * | 2/2001 | Teran et al. ................ | 210/609 |
| 6,245,121 B1 * | 6/2001 | Lamy et al. ..................... | 71/1 |
| 6,346,240 B1 * | 2/2002 | Moore, Jr. ................. | 424/76.6 |
| 6,375,844 B1 * | 4/2002 | Ehrlich ........................ | 210/605 |
| 6,387,267 B1 * | 5/2002 | Kantardjieff ................ | 210/615 |
| 6,398,959 B1 * | 6/2002 | Teran et al. ................ | 210/609 |
| 6,470,828 B1 * | 10/2002 | Townsend et al. .......... | 119/447 |
| 6,863,826 B2 * | 3/2005 | Sheets ........................ | 210/705 |
| 6,890,429 B2 * | 5/2005 | Herring, Sr. ................ | 210/167 |
| 6,908,554 B2 * | 6/2005 | Jackson ...................... | 210/601 |
| 7,001,512 B1 * | 2/2006 | Newsome .................... | 210/181 |

(Continued)

*Primary Examiner*—Robert James Popovics
*Assistant Examiner*—T. Woodruff
(74) *Attorney, Agent, or Firm*—Michael F. Hughes; Hughes Law Firm, PLLC

(57) ABSTRACT

A method and apparatus for removing settleable solids and unsettleable solids from a partially closed flush system in a diary milking operation whereby a first processing tank bottom removes settleable solids contained therein where the net current flow vertically in the process tank is less than the settling rate of the settleable solids contained therein. The process tank batch feeds a plurality of thickening tanks that are each allowed to settle for a period of time before transferring fluid is to a second separator. The method and apparatus is particularly conductive for feeding a digester.

31 Claims, 11 Drawing Sheets

U.S. PATENT DOCUMENTS

| | | |
|---|---|---|
| 7,005,068 B2 * | 2/2006 | Hoffland ..................... 210/603 |
| 2001/0013497 A1 * | 8/2001 | Kolber ....................... 210/747 |
| 2002/0020677 A1 * | 2/2002 | Noll ........................... 210/766 |
| 2002/0079266 A1 * | 6/2002 | Ainsworth et al. ......... 210/603 |
| 2002/0084227 A1 * | 7/2002 | Sower ........................ 210/739 |
| 2003/0057160 A1 * | 3/2003 | Williams et al. ............ 210/718 |
| 2004/0154988 A1 * | 8/2004 | Sheets, Sr. .................. 210/718 |
| 2004/0159608 A1 * | 8/2004 | Hoffland ..................... 210/620 |
| 2006/0273048 A1 * | 12/2006 | Doyle et al. ................. 210/781 |

* cited by examiner

MANURE SEPARATION FOR DIGESTER METHOD AND APPARATUS

This application claims priority benefit of U.S. patent application Ser. No. 60/494,986 filed Aug. 12, 2003.

BACKGROUND OF THE INVENTION a) Dairy Operation Background

In general, the invention is a system for recovering manure in a diary operation or other environments where manure is recovered for purposes of supplying a digester or other practical use. In one form the implementation can be executed on an existing dairy facility that employs a flush system to remove the manure from the stalls or a location containing cows.

Many dairy systems struggle with conflicting criteria and various portions of their diary operation. When a dairy employs a digester for extraction of energy from biodegradable material which is contained in settleable and unsettleable solids, it is desirable to feed a digester at a fairly high concentration of this biodegradable material. In general, the biodegradable material can generally be classified as a settleable solid or as unsettleable solids. A settleable solid is adapted to be removed by a settling process with a tank. An unsettleable solid contains very fine particular matter or dissolved solids which are not adapted to be removed by any form of settling process without chemical coagulants.

Therefore, it is desirable to feed a digester with settleable and unsettleable solids at a sufficiently high percentage rate with respect to the water to reduce the amount of cost for the size of the digester and the ongoing costs of maintaining such as heating the fluid and solid mixture contained therein.

The dairyman has another criteria for the flush system where it is desirable to have the unsettleable contact (as well as settleable content) within the flush system kept to a minimum. In general, the biodegradable material to feed a digester is all retrieved from the flush system of the dairy. The flush system requires water as the operating medium to flush out the stalls of the dairy containing a material as well as manure and an assortment of other solids. Generally a flush system is a partial close loop system where the flush water is recycled to some degree. Oftentimes it is desirable to add an injection of water to dilute the amount of unsettleable material contained in the partially closed loop system.

The addition of water is normally problematic for the digester whereby it adds further cost for removal of the water or alternatively the digester must be made larger to accommodate a lower concentration of solids. Alternatively in the worst-case scenario, the digester may not function properly at all because the solid content is at such a low percentage.

Therefore, prior to the system described herein, the dairy was forced to either compromise the purity of the flush water by having a higher concentration of unsettleable solids or have excessive cost of building and maintaining a digester which has to process a watered down lower percentage of biodegradable material.

b) General Background of Invention

Depending upon the dairy, certain material flushed with the flush water settles better and of course ranges of flush rates and flush water per day varies immensely. For example, depending upon the flush system in the dairy, the flush intervals, the bedding material in the dairy and other factors all determine the settling rates of the settleable material. Present observation indicates that the settling rates vary a substantial amount from dairy to dairy.

In general, the system described herein employs a novel topography of components adapted to pass a large volume of fluid through the system yet have the ability to recover settleable solids therefrom while maintaining a low percentage of unsettleable solids in the recirculating flush water.

Prior art systems incorporate a first separator that feeds a process tank. Fluid is taken from the process tank and is used to flush the dairy in a partial closed loop system. The system is partial closed loop because new solid material is always being added during the flush and material leaves the system in the process tank. A certain amount of unsettleable solids come out of the dairy everyday. The unsettleable solids are similar as dissolved solids but further include fine suspended solids and these fine suspended solids as well as dissolved solids are referred to as unsettleable solids. These unsettleable solids exit in solution at the bottom portion of a process tank. The amount of water added at the flush must equal the amount of water exiting the closed loop system.

For example, if 1000 lbs. of unsettleable solids enter the system a day and 990,000 lbs. of water is in the closed loop system, the level of unsettleables will build to 10,000 lbs. in ten days which is 1% unsettleable solid content in the partial closed loop system by weight. Therefore, removing a portion of the fluid in the close looped flush system is desirable to removing the unsettleable solids. Therefore, if approximately 100,000 lbs. of water and unsettleable solids are removed from the close loop system per day, 1% of the 100,000 lbs. would include 1000 lbs. of unsettleable solids which approximately is the amount of unsettleable solids added to the partially closed loop system. Therefore, per day, the system is in equilibrium; however, 100,000 lbs. of fresh water must be added to the partial closed loop system and the 100,000 lbs. of exiting water and solids must be processed.

Having more water in the system, in general, is helpful to keeping the unsettleable solids level low. Therefore, the system described herein allows for lowering the content of unsettleables solids that are in the close looped flush region and further having the ability to extract settleable solids therefrom. By having a large quantity of flush water and running more fluid through eh system, the system is actually advantageous to removing the unsettleable solids.

Using the example above, let us say it is desirable in a certain application to keep the flush water below 1% of unsettleables solids which appears as clean translucent water without visible particles. In the broader range, between 0.5% and 2% of unsettleable solids is acceptable for certain flush dairy situations. In general dairies have such a variety of amounts of unsettleables, the published literature on solids in dairy flush system in scarce relating to the content of solids that are settleable and unsettleable. This is likely because the amounts vary tremendously from dairy to dairy. A greater input of water in come cases requires larger and more thickening tanks descried further herein.

In the system described below, the flush water from the dairy passes through a separator to a process tank having the bottom removal system by head pressure. This is a feature where prior art tends to employ pumps have bottom removed for 30 seconds every seven minutes for example. The starting and stopping of the pumps cause for wear on the equipment and potential noise pollution.

Bottom removal of the processed tank can be done between once every half-hour to once every two hours depending upon the thickening tank, settling rate, continuous flush versus batch flush and other factors. For example, a 2000 cow dairy that flushes eight lanes which flushes each lane for 10 minutes and then has no flushing for four hours would be more of a batch style flushing system. Such a system would need to coordinate with the processing tank to bottom remove solids after a sufficient time is allowed for settling.

Prior art methods of bottom removal generally do so in a low fluid flow manner. An aspect of the removal descried below is a bottom removal process at a high-volume burst. In the system described below some turbulence is desirable to facilitate the removal. Thereafter, the bottom removal in the process tank is ceased to allow for additional and further settling. It has been found that a burst of high volumetric flow removes the solids sufficiently. For example, if there are 1.5 inches of solids in the bottom of the tank the timing is such to burst the solid region out and remove 2 to 3 in. of water and settleables at the bottom. The one and a half inches of chase water is used to help remove the unsettleables. The bottom 1.5 inches for example could be 5% solids and the top 1.5 inches could be one half percent solids on average. Therefore, as described in the first example above, the dairy must take out a certain amount of water which is more than the height of the solid layer in the bottom of the process tank. The bottom removed effluent from the process tank is directed to one or one of a plurality of thickening tanks.

The thickening tanks are adapted to receive the bursted fluid from the process tank in a batch like process. Prior art systems relating to management of solids from a flush system include incorporate settling cells. In general, settling cells are large concrete open structures that are adapted to have effluent from either a prior art processing tank or directly from a first separator receiving flush water from the dairy. However, the fluid and solid mixture flowing through settling cells did not provide a steady substantially still environment to facilitate and promote settling of the settleable materials contained therein. The management of settlement cells and consistency of the solids contained therein is generally problematic and time-consuming. Further, solids from settling cells are delayed to getting into a digester or other forms of use. When the settling cells are in operation, they may fill with solids over the period of a week and when one is full, the transfer of effluent from a process tank would then occur to another settling cell. Weather conditions have an impact and are a causal factor to the lack of consistency of results of the solids in the settling cells. Further, as the manure sits in settling cells exposed to the environment, the biological material contained therein is undergoing a natural breakdown by various organisms and hence not capturing energy contained therein and further there are various odor considerations. The anaerobic and aerobic activity is problematic causing various foul odors that are oftentimes unpleasing to neighboring properties. Some settling cells are large and it may be months before managing them therefore amplifing the problems associated therewith.

The thickening tanks as recited herein are enclosed and adapted to pass fluid as well as solids therethrough the system. Further, the thickening tanks are adapted to remove fluid from the process tank which inherently removes dissolved and unsettleable solids contained therein to fluid.

For example, a 7000 to 8000 cow dairy may have two, three or four 10,000 gallon thickening tanks depending upon the numerous parameters dictating the flushing system of the dairy. Let us say in one embodiment that a dairyman has three 10,000 gallon thickening tanks labeled A, B and C that are adapted to receive fluid intermittently from the process tank. Therefore, the process of filling the tanks will be to fill the first tank A in the first hour. Thereafter sometime during the second hour tank B will be filled from the process tank in a batch like operation. In the third hour tank C is filled from the process tank and during this hour the material from tank A is removed in a two-step process where the first 30 minutes may be used to decant at the upper portion of fluid and the second 30 minutes are used to bottom remove the fluid containing solids. Therefore, tank A will have almost two hours of settling time. It should be noted that the thickening tank creates 100% still environment where there is not fluid entering the tank stirring up the settled material after it is filled.

Prior art devices adapted to feed a digester discourage the use of excess water. A dairyman desires a fresh input of water to reduce the amount of settleables (as well as unsettleables, that comprise the solids in the fluid) contained in the flush water and hence such larger quantities is not conductive for use with a digester. However, the system provided below allows for recovery of a large amount of solids from flush water in a concentrated form and provides for flush water that is pure with a reduced amount of unsettleable solid content contained therein.

SUMMARY OF THE INVENTION

In one form the method and apparatus comprises a fluid and solid separator system for a dairy having a flushing system with flush water having unsettleable and settleable solids therein. The flush system comprises a first separator adapted to remove settleable solids from returning flush water. The first separator has a first ejection port to deposit the thick fraction of the flush water to a first storage location and a second ejection port adapted to deposit the thin fraction of the flush water to a process tank. The process tank is adapted to receive the thin fraction of the flush water from the first separator where the process tank comprises an injection port adapted to eject the thin fraction of the flush water that is positioned in the lower one half portion of the process tank. The process tank further comprises a flush water feed line that is in communication with the flushing system of the dairy to form a partially closed loop system. The process tank has a cross-sectional diameter allowing a vertical flow rate of the fluid contained therein that is less than the settling rate of the settleable solids. A bottom removal grid is adapted to remove discharge fluid comprising settleable and unsettleable solids contained in the discharge fluid in the lower portion of the process tank.

A thickening tank is in communication with the process tank whereas the thickening tank is adapted to be filled in a batch like matter from the process tank where the discharge fluid from the thickening tank is allowed to settle for a period of time to allow settling of the settleable solids contained therein.

In one form provided second separator adapted to receive solid concentrated fluid portion of the discharge fluid from the thickening tank in an intermittent manner after the discharge fluid contained therein has a sufficient time to settle, the second separator has a first ejection port adapted to eject the thick fraction of the said solid concentrated fluid portion to a second storage location and a second ejection port adapted to eject the thin fraction of said solid concentration fluid portion to long term storage.

DESCRIPTION OF THE PREFERRED EMBODIMENTS

Figure 1:
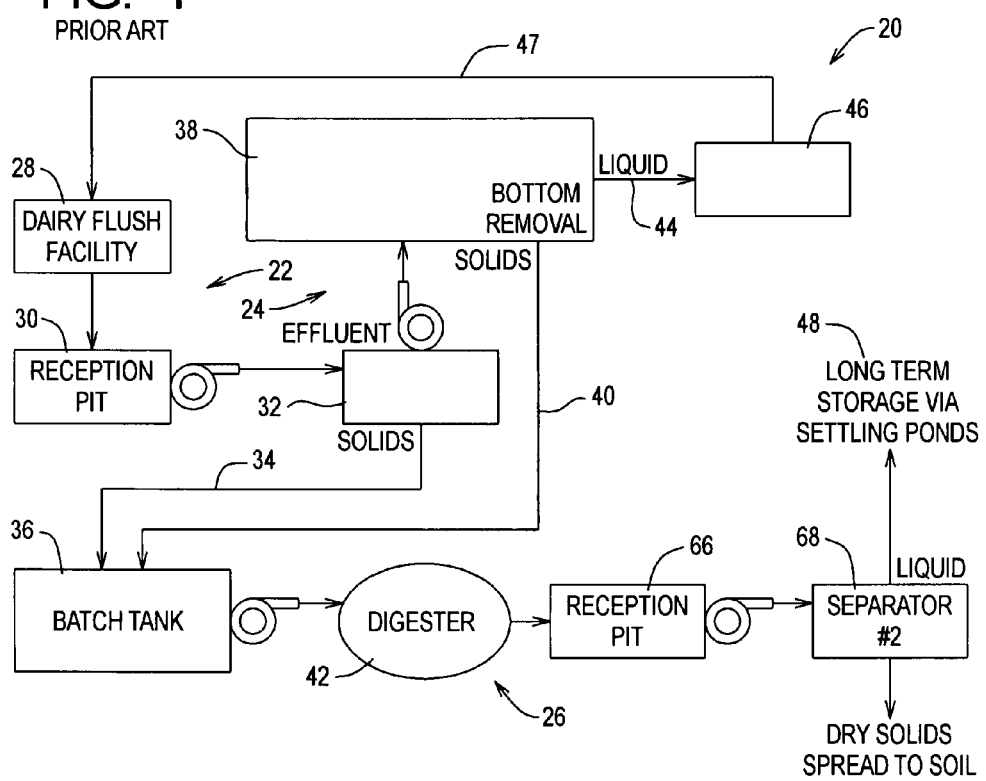
FIG. 1 shows a prior art of a schematic block diagram.

There will first be a description of a prior art system followed by a detailed description of several embodiments of the method and apparatus for separating water from settleable solids and removal of a percentage of unsettleable solids from flush water in a dairy operation As shown in FIG. 1, there is a schematic view of a prior art system. The prior art operation 20 comprises a recovery area 22, a dewatering area 24 and a digester region 26. In general, the digester is fed fluid with less than 8% solid content. This is less desirable because the digester must heat up a larger volume of water which does not produce usable alcohol or methane gas depending upon the type of digester.

The process begins in the recovery area 22 where manure is recovered at the stall region 28 and is flushed to a reception pit 30. The manure is then pumped to a fluid/solid separator 32. The separator 32 passes its solids through line 34 to a batch tank 36. The remainder of the liquid is passed to the process tank 38. The side hill will separate a portion of the solids from the liquid portion from the manure. The process tank (clarifier) 38 than bottom feeds a portion of the solids down line 40 to the batch tank 36. This process is done on demand so that batch tank has a desirable solids ratio which is adapted to be fed to the digester 42 in the digester region 26. In one form, the solid content in the batch tank 36 is substantially around 7-8%. the remainder of the liquid in the process tank 38 passes through line 44 to a flush tank 46 that passes fluid through line 47 to the diary 28. Effluent is discharged from the digester to a reception pit 66. Thereafter, the effluent from the digester is pumped to a separator 68 and dry solids are recovered to be recycled into soil. The discharge liquid is sent to a settling pond 48.

It has been found that the low solid content of less than 8% is problematic for cost-effectively operating a digester. Therefore, a higher solid content while maintaining a low percentage of unsettleable solids recirculated in the flush system is desirable. In general, the system as shown in FIG. 1 is particularly undesirable because the thick fraction through line 40 must remove all of the solids and fluid to feed the batch tank 36. Therefore, the operator has little or no control of the content within the batch tank 36 that feeds the digester. This is also particularly problematic because there is a tendency to have a higher solid concentration that returns through line 47 to the flush to the dairy 28. The higher solid concentration of unsettleable solids has a more viscous fluid in the flush water whereby the separator 32 works less effectively and is essentially blinded by the thicker fluid and higher viscous fluid passing thereto.

Figure 2:
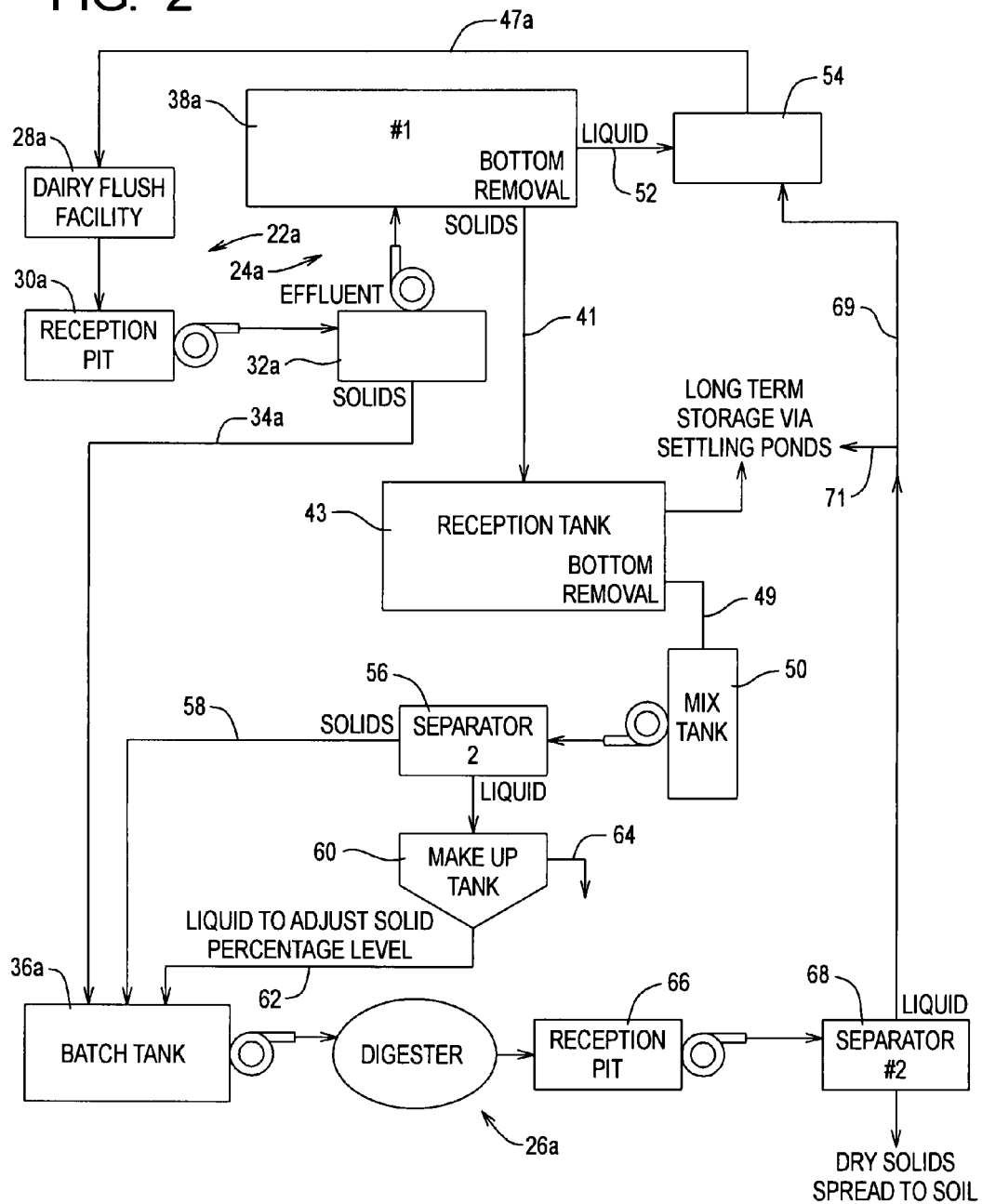
FIG. 2 shows a second embodiment of the present invention.

Now referring to FIG. 2, there is shown a schematic block diagram of the of a separation system. It should be noted that where applicable, similar numerals will be applied to elements that are substantially similar as the elements shown in the prior art embodiment of FIG. 1 except they will be distinguished by adding the character "a" to the end of the numeral.

The system in FIG. 2 comprises of a recovery area 22a, a dewatering area 24a and a digester region 26a. In a similar manner as shown in FIG. 1, manure is recovered in the recovery area 22a from a flush facility 28a where cows deposit manure and a washing procedure passes the manure to the reception pit 30a. The manure is then pumped to a separator 32a which in one form is a rotary separator whereby solids are removed and are passed through line 34a to the batch tank 36a. The remainder of the fluid is pumped to the processing tank 38a (clarifier 38a) and solids are extracted from the clarifier through line 41 to a reception tank 43. It should be noted that all of the matter that leaves a process tank and is taken out of the loop must come out of the bottom portion except for emergency overflow.

The reception tank 43 is adapted to receive the bottom removal scouring from the process tank 38a in order to capture the settled undissolved solids contained therein. In a similar manner, the solids from the reception tank 43 are removed from the bottom region and passed through line 48 to the mix tank 50. It should be noted that the bottom removal process can be done as a batch operation where the settling takes place for a period of time (at least 10-15 minutes) and is thereby withdrawn via a pump or gravity fed means by the hydrostatic pressure of the tank.

Now referring back to the processing tank 38a, the remainder of the liquid in the processing tank 38a passes through line 52 to a flush tank reserve 54 that is adapted to flush the dairy 28a through lines 47a. This fluid is used for flushing the dairy flush facility 28a for the next recovery process of manure. The solid content in the mixed tank 50 is higher than in the flush tank 54. The manure water mixture is then pumped to a separator 56 which can be a screw-type separator where solids pass through line 58 to the batch tank 36a. The reminder of the liquid goes to an intermediate mix-up tank 60. A portion of the contents of the makeup tank 60 are directed through line 62 to the batch tank 36a. The digester 26a is adapted to receive concentrated manure solids at a specific solid to liquid ratio. If the digester is adapted to receive for example, 12% solids, the fluid that passes through line 62 from the makeup tank 60 can be passed to the batch tank 36a on demand to ensure the proper solid ratio is maintained. For example, the batch tank 36a could have a solid ratio of 14%. The liquid pumped from the makeup tank 60 would have a solid content lower than 12% and have a higher concentration of solids that are pumped through thin fraction line 64. Thus the makeup tank 60 increases the recovery of solids to be passed to the digester but also provides a sufficient amount of fluid to dilute the contents of manure solids in the batch tank 36*a*.

Also shown in FIG. 2, effluent is discharged from the digester to a reception pit 66. Thereafter, the effluent from the digester is pumped to a separator 68 and dry solids are recovered to be recycled into soil. The separator 68 having a discharge ejection port (as do all the separators) where the thin fraction is adapted to pass therethrough and in one form can pass through line 69 to the flush tank 54 or alternatively can pass through line 71 to long-term storage. It is theorized that effluent downstream of a digester may be helpful for inhibiting malicious bacteria growth within a flush tank.

Figure 13:
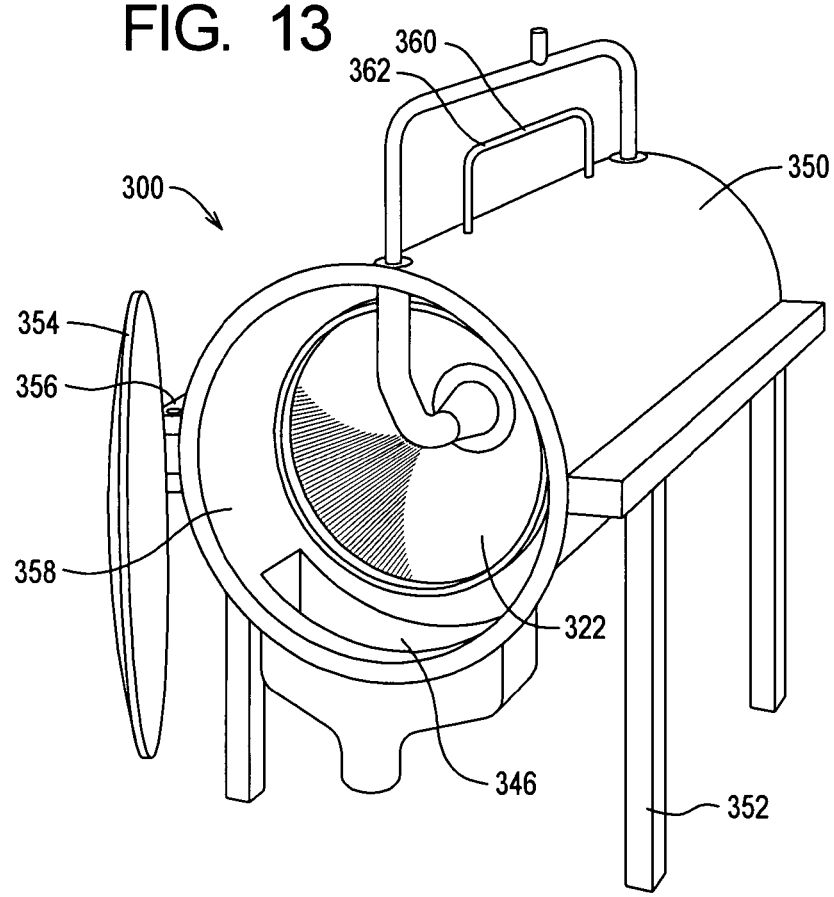
FIG. 13 is an isometric view of one type of separator adapted to be employed downstream of a thickening tank.
Figure 14:
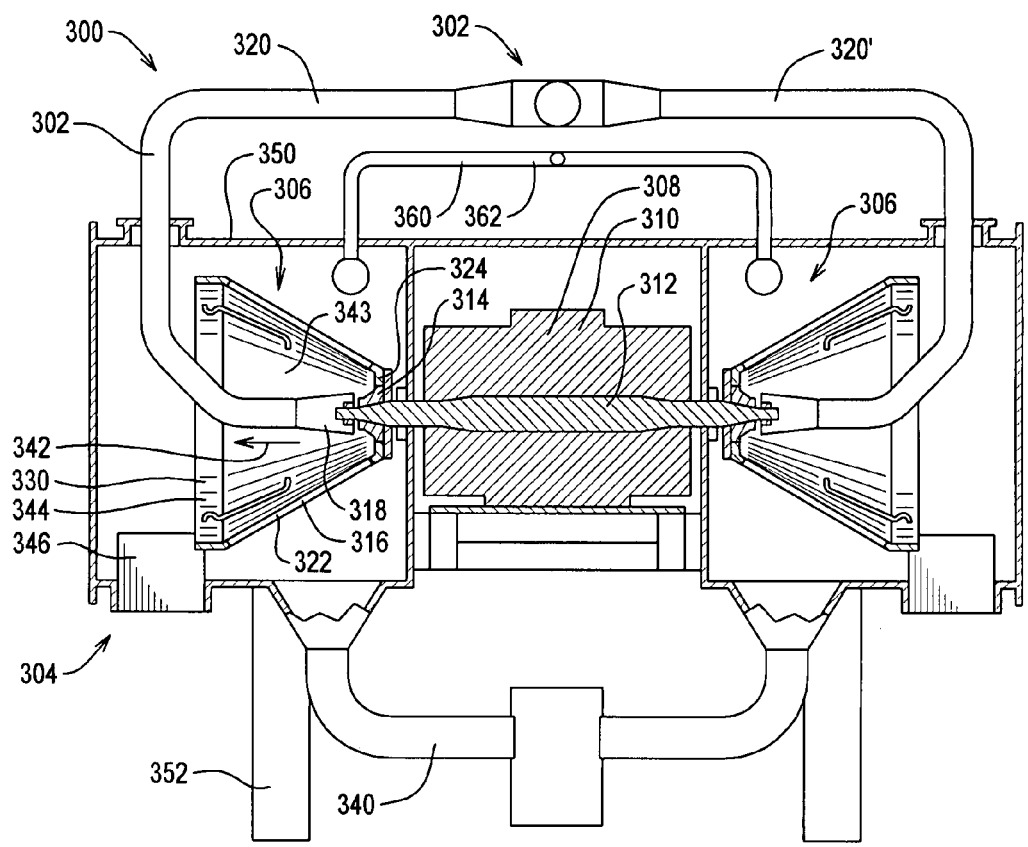
FIG. 14 is a section view of the separator as shown in FIG. 13.

It should be noted that the separators referred to throughout the description can be of a variety of sorts. In general there are forced separators and settling tanks. The separators have an input line and a first output line having a lower solid content then the input line and this effluent is referred to as a thin fraction. A second output line has higher solid concentration than the input line and is referred to as a thick fraction. In general the separators other than the process tanks and thickening tanks described below are forced type separators such as drag chain, rotary screen, screw press, side hill known as a static/slip screen, etc. type separators. FIGS. 13-14 show a different type of separator that is conductive for separating solids from liquids downstream of the thickening tank which is described below.

Figure 3:
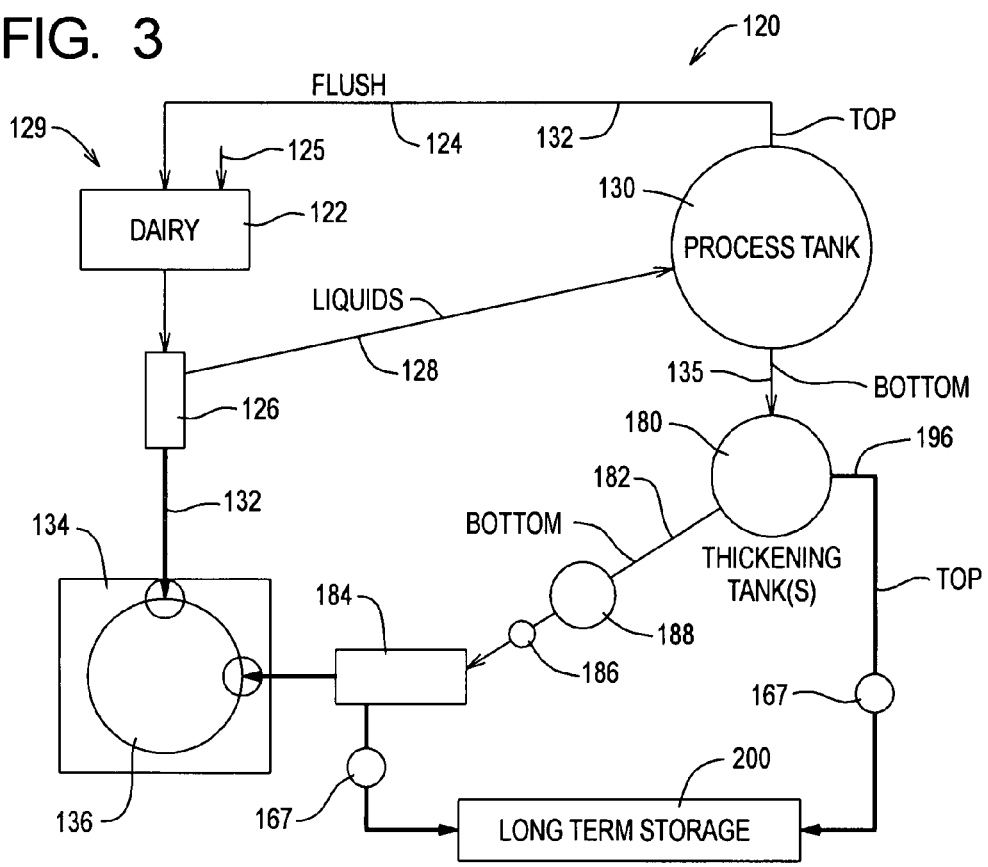
FIG. 3 is a schematic topographical view of a method for separating water from settleable solids.

As shown in FIG. 3 there is a schematic topography of a system for another solid recovery indicated at 120. The diary 122 is flushed with flush water from the flushline 124. The water which is a mixture of dairy-solid products such as manure is sent to a separator 126. In general, when the term pump is used it can be either gravity fed with hydrostatic pressure or with a pump such as a positive displacement or centrifugal pump or any other foreseeable method of transporting fluids from one location to another. The separator 126 in one form is a fiber separator which can be one of a plurality of different types and name brands of separators such as drag chain, rotary screen, screw press, side hill known as a static/slip screen, etc. Thereafter, the liquid with 'fines' contained therein is pumped through line 128 to the process tank 130.

Before continuing discussion of the tank 130, it should be noted that the separator 126 is particularly conductive for removing buoyant material and other material which is not conductive for removal by way of settling. All of this material is removed through line 132 and passes to the solid storage location 134 which in one form is simply a concrete slab where the solids accumulate in the center region 136. As described further herein the numeral 134 can also represent a digester or a tank to feed a digester. The solids may stack on this slab in the ballpark of 80% moisture and 20% solids; however, because the consistency is so loaded with fiber producing a matrix-like effect structure, it has a solid consistency which can be easily handled with machinery such as a front loader. The upper portion as shown in FIG. 3 comprises a partially closed looped system that is adapted to recirculate fluid from line 128 and back to the dairy 122 through line 124. This is a partially close looped system because solid material from the dairy is added to the fluid circuit as well as freshwater as indicated at 125 in FIG. 3. Further, a portion of the solid settleable material as well as fluid that only partially contained settleable material from process tank 130 is taken out of the system at line 135 in a manner as described below.

There will now be a discussion of the process tank/clarifier tank 130. In general, the size and dimensions of the tank are a function of the total quantity of input from line 128, the total solid content of the liquid passing through line 128 and the settling rate of the solids passing through line 128. The estimated dimensions of the process tank 130 can be determined based upon the qualities of the fluid from the separator 126 flowing through line 128, the total in volumetric throughput flowing vertically through the process tank 130, the solid content and the settling rate properties of the settleable solids and the desired percent content of unsettleable solids in the partially close looped system 129.

Figure 4:
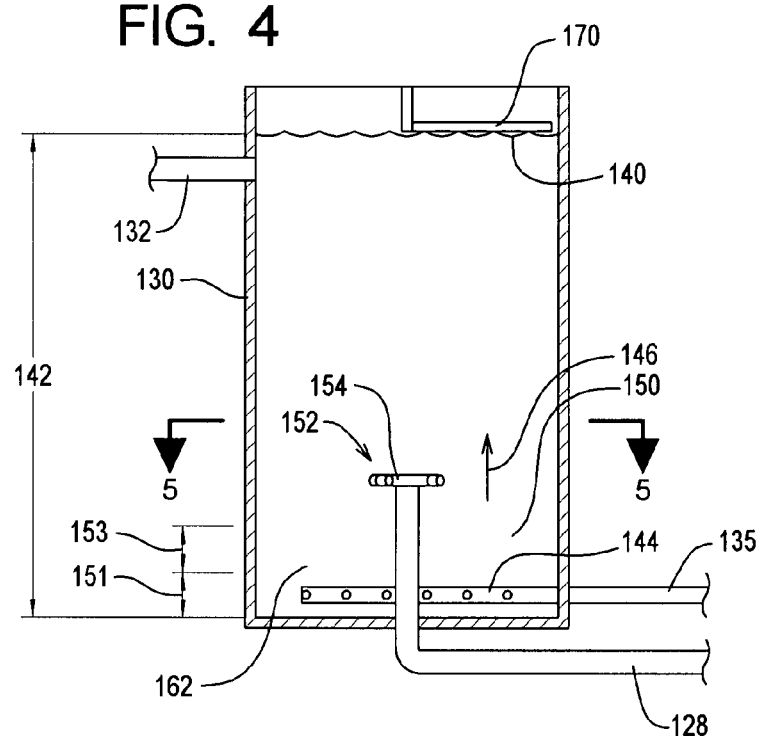
FIG. 4 is a side view of a process tank that is adapted to receive effluent from the first separator.

For example, if larger particles settle at four inches per minute within the tank 130, present analysis indicates that smaller settling particles will settle at, for example, one-fourth that rate such as one inch per minute. In one form, the process tank is a continuous tank and not operated in a batched manner, and the input from line 128 must equal the output through lines 132 and 135 which are described further herein. Therefore, for example, as shown in FIG. 4, the tank 130 has a cross-sectional area indicated at 148 which is such a manner that the input from line 128 will equal the output of lines 132 and 135. The water height within the tank indicated at 140 is at a level 142 from the mean average withdrawal area from the extraction grid 144 which is in communication with line 135. The level 142 creates a sufficient amount of hydrostatic pressure to turbulently and forcefully eject the solids through the extraction gird 144 comprised of a plurality of laterally extending members 149 that have openings 157 adapted to have settleables and fluid pass therethrough (see FIG. 5). The members 157 are spaced to allow for recovery of settleable material positioned at the bottom of the process tank 130.

Figure 5:
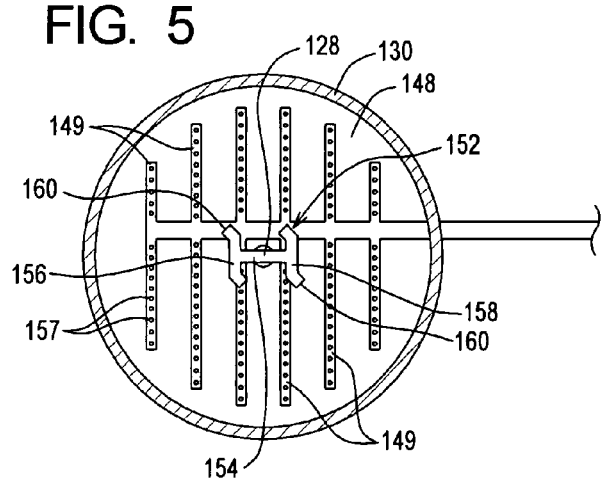
FIG. 5 is a top view of the process tank taken along line 5-5 in FIG. 4 showing one form of an ejection nozzle.

Therefore, the settling rate of the smallest settleable particulate matter must be greater than the upflow current of the fluid contained within the process tank 132. In other words, the input from line 128 has a substantial portion of the input fluid flowing upward as indicated by 146 in FIG. 4. This total upflow of current is a function of the volumetric throughput taken out at line 132 divided by the cross-sectional area indicated at 148 as shown in FIG. 5. For example, the cross-sectional are 148 is 100 square feet, and 100 cubic feet per minute is the average volumetric flow thorough this area, then the upflow current is approximately one foot per minute flowing upward. Of course this upward flowing is a function of the amount of withdrawal through line 132. It should be noted that during the bottom removal process, a valve is opened and the solids in the lower portion of the processing tank 130 are turbulently removed (although there may be laminar flow lifting the solids). Therefore it should be noted that because this only happens in an intermittent basis, the net volumetric flow and vertical velocity is more relevant during the settling portion within the processing tank 130 where the valve along line 135 in FIG. 3 is closed and settling is occurring within the processing tank 130. Therefore, if the net upflow current is at, for example, one foot per minute and the settling of the smallest particular matter must exceed this amount and be say, for example, at least 1.2 feet per minute, thereafter, the solids are accumulated and extracted from the lower region 150 of the tank 130 in a manner described below.

In a preferred form of the introduction of the fluid solid/mixture from line 128, as shown in FIG. 5, the distribution nozzles 152 are such that the input line 128 first hits a T-member 154 which is connected to two additional T-members 156 and 158. The end portion of these T-members are connected to a plurality of ejector nozzles 160. Therefore, if the cross-sectional areas are constant throughout these plumbing components the net velocity of the liquid will be reduced by one-fourth in this scenario. Of course other scenarios and connections can be employed with varying widths to reduce the velocity of the ejected fluid. It is a goal of this ejecting system to have a minimal velocity for minimal disturbance within tank 130 so the settling process described above can take place.

The height of the ejector nozzles 160 is such that it is desirably right at or just above the settling region 162 in the lower portion of the tank 150 preferably in the lower half of the tank and the broader range and more preferably in the lower one forth to one third region of the process tank 130. Alternatively, the height of these ejectors 160 is between three to six feet. In a more preferred range, probably between four to five feet.

Figure 4A:
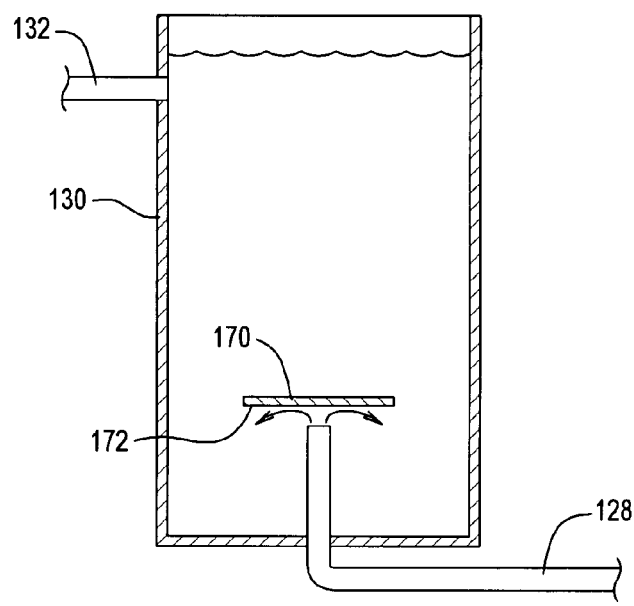
FIG. 4a shows another embodiment of an ejection nozzle.

Part of the goal of the nozzle arrangement 152 as shown in FIG. 5 is to create a circular sweeping action for a slight circular action of the fluid so the suction at the grid of the bottom, so there is no mounding of the settleables. Any solids that accumulate will be inhibited from build up similar to the erosion of a mountain from wind and rain to prevent the mounds of solids at the lower portion of the process tank 130. Another method of doing the nozzle arrangement is shown in FIG. 4a whereby a plate 170 having a lower surface 172 is adapted to receive liquid that is ejected from line 128. As liquid hits the surface 172 and distributes radially outwardly therefrom in a manner which is conductive for settling the solids contained therein. The embodiment in FIG. 4a could by grooved so that there is a circular motion of the incoming fluid similar to the circular motion created by the nozzle 152 in FIG. 4.

Figure 6:
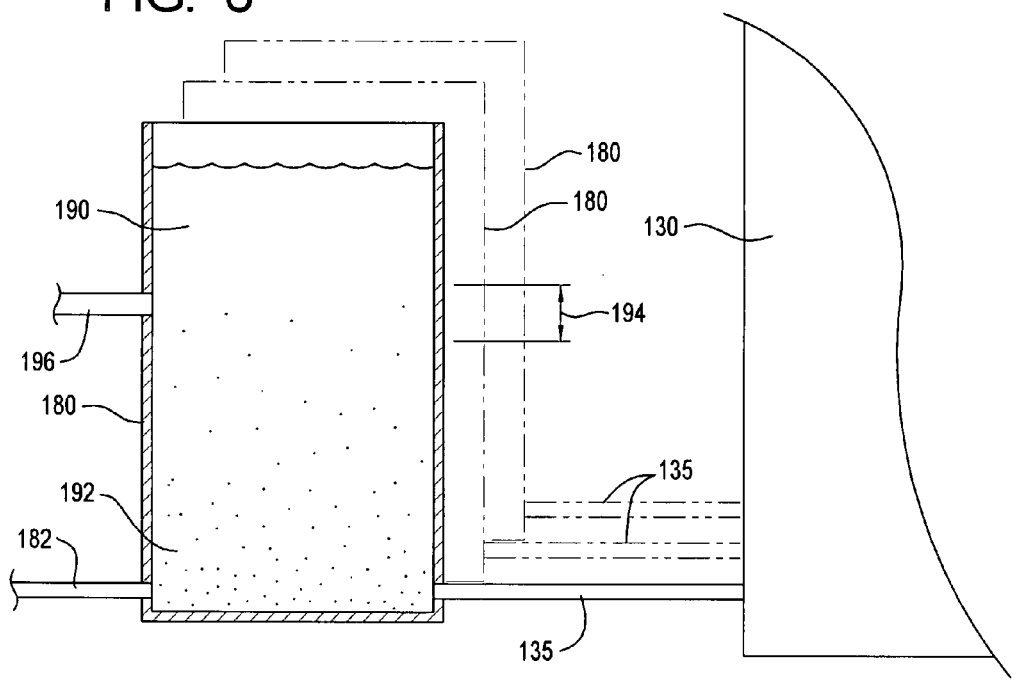
FIG. 6 partially schematically shows a thickening tank adapted to receive a portion of settleable solids and unsettleable solids from the process tank where the upper portion of one of the plurality of thickening tanks has a lower concentration of settleable solids and the lower portion has a higher concentration of settleable solids.

Located in the lower region of the process tank 130 is an ejection grid 144. The grid 144 has laterally extending members 149 with a plurality of openings 149 contained therein adapted to withdraw liquid with unsettleable material and settleable material therethrough. It should be noted that the extraction grids 144 can be one or multiple. It is desirable to have multiple grids to provide redundancy where if one of them fails for some reason such as clogging or other type failure. Each grid can feed separate thickening tanks 180 as shown in FIG. 6 where each of the lines 135 are in communication with separate extraction grids, in one form. Alternatively, one grid is employed and a varying system intermittently feeds one of a plurality of thickening tanks 180.

Although the separator/rotary screen 126 is adapted to remove mainly buoyant material, a sweeper 170 in the upper portion of the tank can be optionally employed. The sweeper is an arm of some sort so such scum-like material can be acquired and vented through a valve in the side portion of the tank 130 at intermittent times or when needed.

Therefore, the design of the tank 130 is predicted upon the volumetric throughputs through lines 128, 132, and 135. The ejection port 132 is required for passing flush water for flushing as shown in FIG. 3 and is in communication with line 124. As mentioned above, a water supply 125 is added to facilitate the flushing at the dairy 122.

As described in detail above, the net volumetric throughput divided by the cross-sectional area indicated at 148 in FIG. 4 is the net vertical velocity of the fluid through the tank which, must be lower than the settling rate of the smallest solids which are found. Therefore, all settleable solids that are found in that particular dairy end up in the lower portion of the tank 130 as well as at the storage location 134 from the first separator 126. It should be appreciated that the bottom removal process for the process tank 130, is such to remove all of the settling solids in a batch like manner from the lower portion of the process tank 130 preferably through a grid 144 as shown in FIGS. 4 and 5.

The bottom removal process entails allowing settleable solids to settle for a period of time such as half an hour to an hour in some situations and thereafter ejecting the settleable solids, water as well as the some of the aqueous unsettleable solids through line 135 to one of the plurality of thickening tank(s) 180 described below. It is particularly advantageous to use the hydrostatic pressure of the water within the process tank 130 to accomplish this bottom removal process. If for example the bottom 2 inches contain settleable solids at a high concentration, the entire bottom 4 inches may be withdrawn from the process tank 130 and pass through line 135 to the thickening tank(s) 180. FIG. 4 shows that the lower region of the process tank 130 having the high concentration of settleable solids is defined as the high concentration of settleable solids region 151 and the area of the process tank 130 immediately thereabove is defined as the concentration of unsettleable solids region as shown 153 in FIG. 4. Depending upon the size of the tank, these regions can be between one to six inches each in the broader scope and between one and a half-three inches in a more defined range.

It is desirable to remove additional fluid from the process tank 130 because this additional fluid contains a certain amount of unsettleable solids. As described in the background above, many diary systems struggle with removing the unsettleable solids from a close loop system and provided a sufficiently high concentration of solids to feed digester to extract energy therefrom. The system 120 is particular conductive for handling a high-volume of fluids and adapted to remove not only settleable material for the process tank 130 but also is well-suited for removal of the unsettleable material where the plurality of thickening tanks 180 now described below are adapted for a secondary sediment removal process.

Now referring back to FIG. 3, the thickening tank(s) 180 are fed by the line 135. These tanks can be a single tank in certain situations but more likely a plurality of tanks, which are fed from the processing tank 130 in a batch like manner. Therefore, it should be noted that the throughput through tank 130 is partially continuous where the line from 128 to 132 is continuous and the extraction through line 135 is a batch-type system where it is done in a rather expedient manner in higher velocities and the extracted mixture is fed to a tank or a plurality of tanks 180.

As shown in FIG. 3, the batched/thickening tanks 180 contain settleable solids (as well as some unsettleable solids which are described above). The thickening tanks 180 are designed to replace settling cells whereby after the tank 180 filled up and had an opportunity to settle, the lower portion is pumped through line 182 and is pressure-fed to the second separator such as a screw press (or a press) 184. A pump 186 is generally employed whereby if the second separator 184 is a press, it is generally pressure-fed and an intermediate tank 188 can be employed which is an intermediate link between tanks 184 and 180 to provide capacitance in the system. The thickening tanks 180 are in the approximate volumetric range (1,000-15,000 gallons) and can range from one tank in some operations to 20 tanks in the broader range and 2. to 4 in a more preferred range. The thickening tanks 180 can be fabricated from an assortment of materials. The frequency of bottom removal out of the primary clarifier and the number of girds within the primary clarifier, the desired settling time within the thickening tanks are all factors which determine the number and size of thickening tanks 180. Further, the decant and settling rates further dictate the size of the tanks depending upon the volumetric output of the decanting process from the upper portion as described below. Further, the method of removing the bottom portion of the thickening tanks 180 such as if it is pumped, gravity fed, fed directly to a digester, are factors to determining the number and size of the thickening tanks 180.

Now referring to FIG. 6, the tank 130 is batch-fed to the tank 180 and as shown in this figure, the tank 180 is filled and partialy settled. In general, there is an upper region 190 and a lower region 192. The upper region, which is roughly separated by a separation ares 194, could be for example 1% solids. The lower region 192 could be, for example, approximately 5% solids. Therefore, when the tank 180 is filled up and has had sufficient time to settle (completed its settling cycle), the upper region is drained (decanted) through line 196 to long-term storage. Thereafter, the higher percentage solids 192 (a thick fraction) is drained through line 182 in a manner described above. Alternately, one ejection line can be used whereby the lower portion is first ejected and transmitted to the second separator 184 and after a period of time, the valve switch and the upper portion of the fluid contained in the thickening tank 180 is ejected and sent to long-term storage After this tank 180 is drained, the process begins again, and while this draining is occurring a similar tank to that as 180 can be filled in a batched manner through a valving system to one of a plurality of tanks 180. Of course the number of tanks depend upon the volume of the dairy, the total solids extracting out from tank 130 and the various solids and net volumetric throughput. To facilitate filling each batch tank 180 as mentioned above, a plurality of grids 144 can be placed within the process tank 130. This further allows for some redundancy in case one of the grids malfunctions.

One observed phenomenon is that the percentage of dissolved/unsettleable solids that is decanted off the top is lower than the dissolved solids removed from the bottom. Present analysis indicates that there is a coagulant effect of some sort where the suspended solids that settle in the lower portion 192 of FIG. 6 attract the dissolve solids beyond the equilibrium points. However, it should be noted that this is only what present analysis and theory indicates. The degree of dissolved solids in the lower region 192 has been estimated to be approximately 25% higher. For example the dissolved solid content may be 0.4% of dissolved solids in the upper portion 190 and 0.5% of dissolved solids in the lower portion 192.

Therefore, after the material leaves the press 184, approximately 30% of the total solid material from the dairy 122 goes to the solid collection area 134 and this 30% mentioned above is from the initial input from the dairy 122. In other words, because 40% of the solid material has already been removed since exiting the dairy 122, roughly half of the solids that enter the press 184 are passed through the collection area 134 and the other half of the solids are passed to the long term storage 200. It should be noted that the circled areas 167 throughout FIGS. 3, 7 and 8 are data acquisition areas which can be used to measure the properties of the fluid at various points such as to help determine the efficiency of the system 120.

Figure 7:
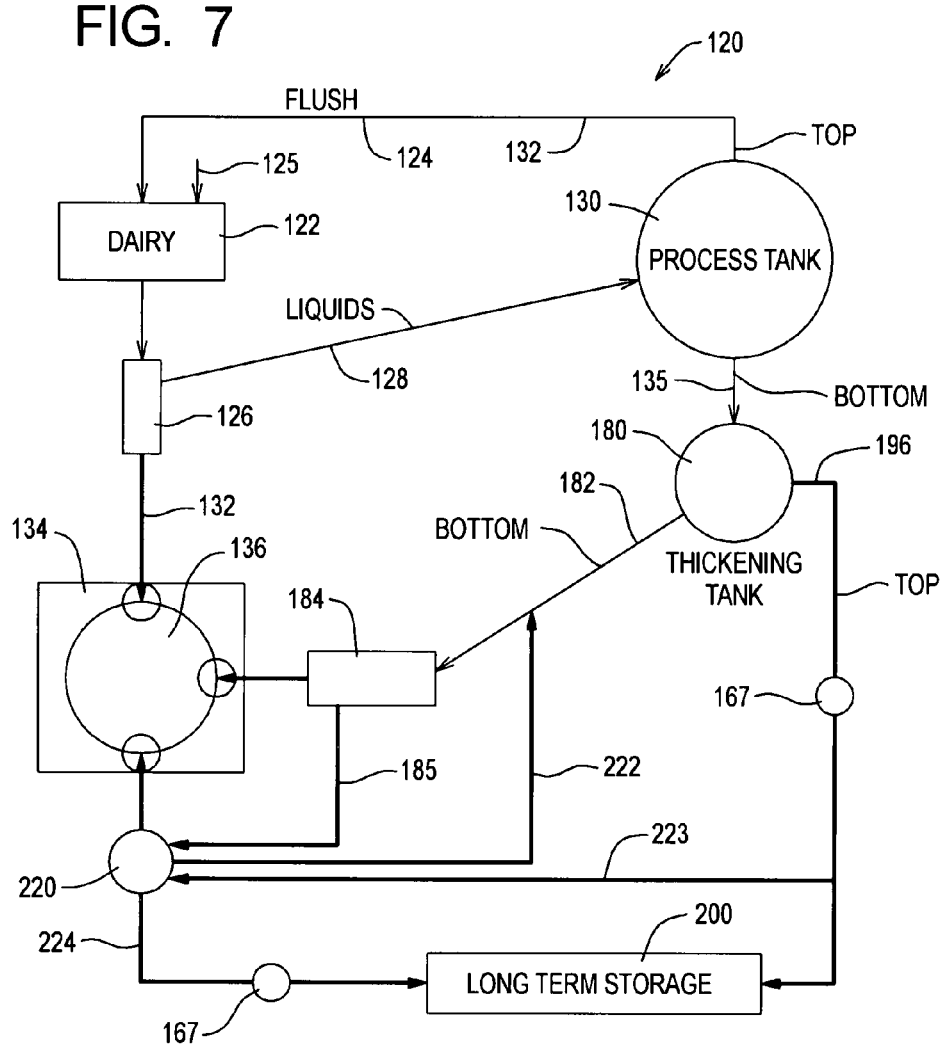
FIG. 7 shows another embodiment of a fluid and solid separator system.

Now referring to FIG. 7, this environment is similar to FIG. 3, however another settling tank 220 is introduced whereby liquid from line 196 is used to dilute the thin fraction from the second separator 184 such as a press or filter separator. In general, the thin fraction from the press 184 coming out of line 185 is fairly viscous and this needs to be diluted so solids contained therein can settle out. Therefore, the settling tank 220 will pass the settled solids in a similar manner as described above through line 222 and be reintroduced to the press 184. The filtered out material passes through line 224 and passed to long term storage 226.

Figure 8:
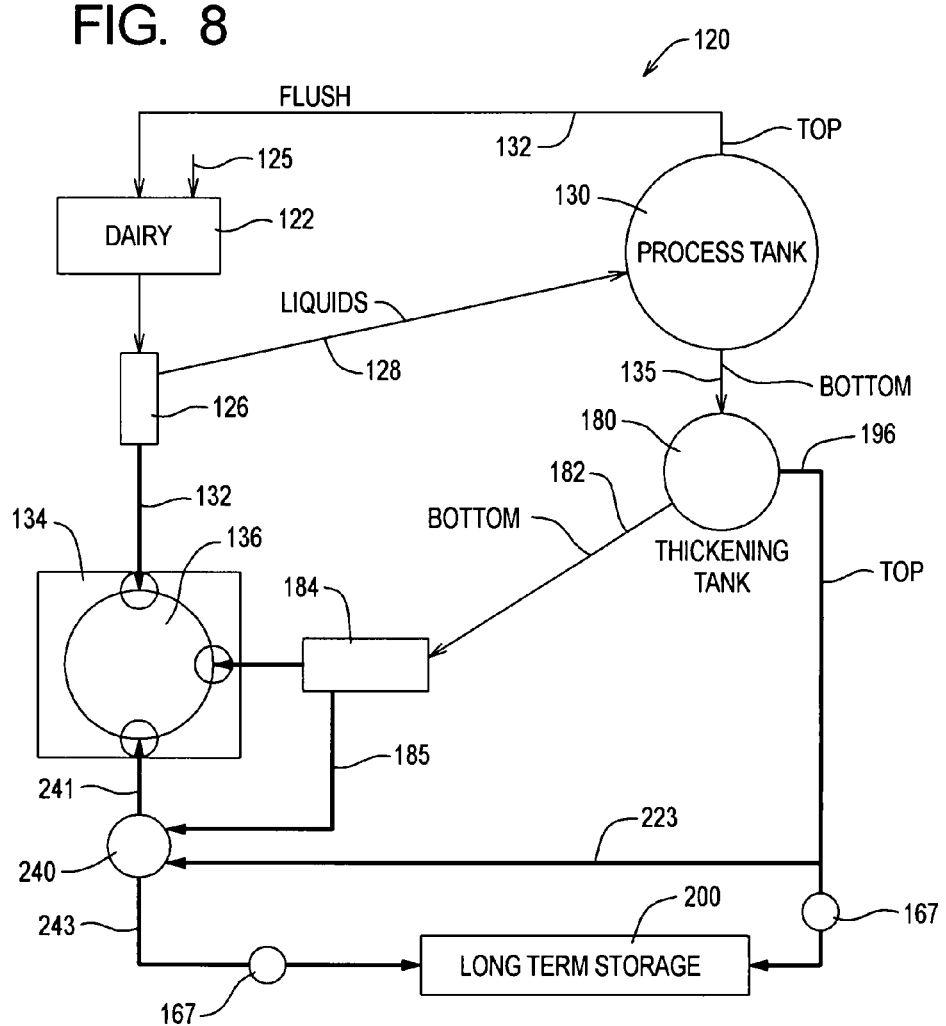
FIG. 8 shows another embodiment of a fluid and solid separator system.

Now referring to FIG. 8, this is a similar manner as FIG. 3, however in the lower left-hand portion the filter separator 240 is adapted to receive a lower volumetric fluid than the previous type of separators whereby the line 185 feeds the viscous material to the filter separator and the higher concentration of solids passes through line 241 to the solid storage location/collection area 134 and thin fraction through line 243 to long term storage 200.

An optional feature in FIGS. 7 and 8 is a feedback line 223 which is taken from the line 196 which top feeds from the thickening tanks 180. This feedback line 223 is adapted to feed the settling tank 220 to facilitate the settling.

Figure 9:
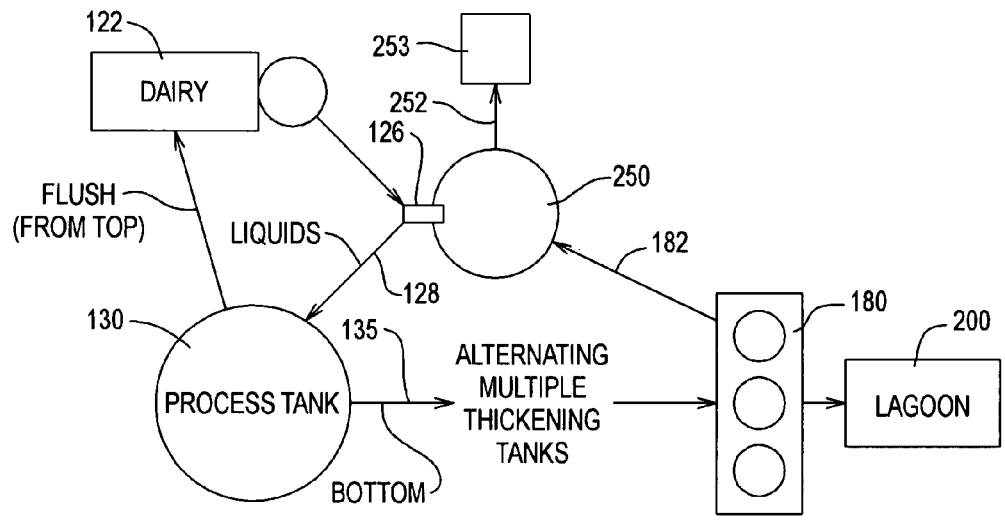
FIG. 9 shows another method for separating water from the solids where material is passed directly to a digester.

FIG. 9 is an embodiment where portions of the previous embodiments are substantially employed; however, a digester is used to recover energy from the solids. In general, after the fluid leaves the dairy 122, and passes through the reception pit (which is actually present in FIG. 3), the first separator 126 which is one form is a rotary screen, operates in a similar manner as described above and passes the solids not to the collections area 134 but to the mixing tank 250. On the right-hand portion of FIG. 9, the thickening tank(s) 180, which can be one or a plurality of thickening tanks, receive fluid from the processing tank 130 in a similar manner as described above whereby in one form a plurality of thickening tanks 180 are employed in a batch-like parallel process. The resulting thickening portions of the tank(s) 180 pass through line 182 and are fed to the mixing tank 250. The combination of these two high-solid content fluids are passed to the digester 253 through line 252.

Figure 10:
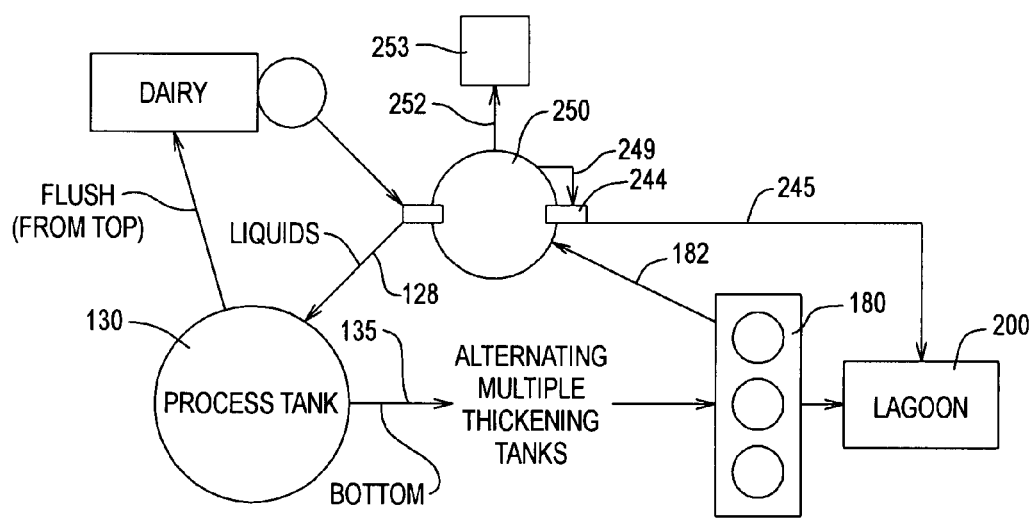
FIG. 10 shows another embodiment of a method of feeding a digester.

Now referring to FIG. 10, another embodiment is employed whereby a second separator such as a press 244 receives an input from the mix tank 250 through line 249 and returns the thick fraction to the mixing tank 250 and the thin fraction to the lagoon/long-term storage 200. In general, the embodiment as shown in FIG. 10 is employed where the content within the mixing tank 250 must be thickened. Therefore, the press 244 is adapted to take the thin fraction through line 245 to the lagoon 200. The high solid content area is reintroduced back into tank 250. Alternatively the thick fraction can be supplied to an additional tank and a bottom removal line from the mix tank 250 can be supplied to dilute the mixture for a proper ratio of solids to feed a digester.

Of course in the embodiment of FIGS. 3-8, the collections area 134 can be digester or a tank to feed a digester. Further the mix tank 250 could be a collections area to collect solids for further use.

Figure 11:
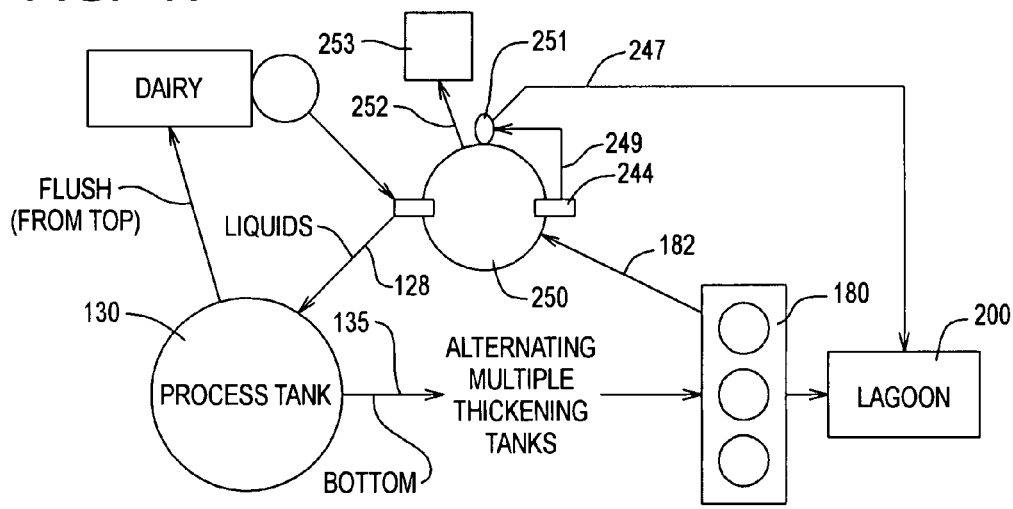
FIG. 11 shows another method of feeding a digester which is adapted to produce a higher solid content of influent thereto.

Now referring to FIG. 11, as shown in this embodiment the separator such as a press 244 now feeds the thin fraction to a separator such as a filter separator 251. Thereafter, the very high solid concentration extracting from the filter separator 251 is reintroduced into the mixing tank 250 to thicken the net content therein. Then thin fraction from the separator 251 passes through line 247 to the lagoon/long term storage 200. Alternatively the thick fraction from both of the separators 244 and 251 can be fed to an additional tank. The effluent from the mixing tank 250 can be fed to this additional tank to dilute the solid content mixture therein and feed a digester 253 at a proper solid content ratio.

Figure 12:
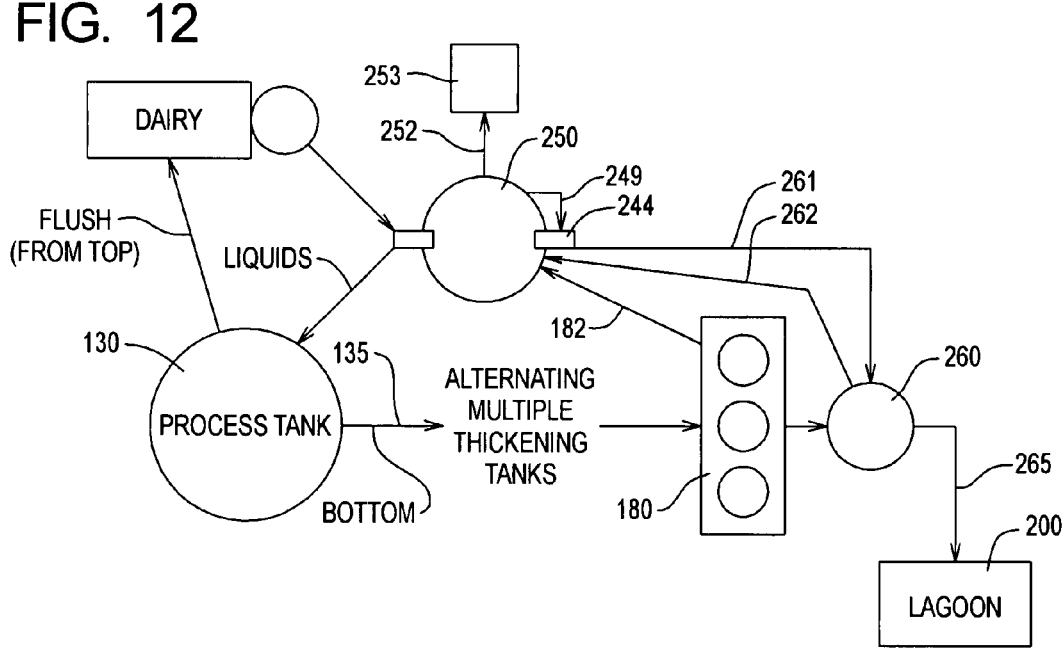
FIG. 12 shows yet another method of feeding a digester.

Now referring to FIG. 12, another schematic embodiment is shown whereby a settling tank 260 is employed and the decant from the thickening tanks 180 is passed to the thickening tank 260. Further, the material passing through line 261 from the press 244 is bottom fed and material passes through line 262 and is reintroduced back into the mixing tank 250 in a continuous process. The tank 260 is a cone-bottom tank so all of the material therein gravitates to one portion to facilitate pump removal to continually operate and extract high solids from line 262. It should further be noted that the volumetric throughput is reduced in tank 260. Therefore, a cone-bottom tank is sufficient to carry in this embodiment where the upper portion ejects fluid through line 265 to a long term storage/lagoon.

Of course the embodiment in FIGS. 3-8 the collections area 134 can be digester or a tank to feed a digester. Further the mix tank 250 could be a collections area to collect solids for further use.

It should be noted that a digester could be another industrial process requiring a certain level of solid content therein for any form of processing to derive energy or usable matter material therefrom. It should further be noted that the various connections and pipes should be well-suited for high volumetric flow and can be made from any variety of piping systems such as PVC pipe.

Now referring to FIGS. 13 and 14, there is shown a filter separator 300 that is particularly applicable as a separator (second separator) that is downstream of the thickening tank(s) 180. In general, the filter separator 300 is more suited for a lower total volumetric throughput of influent therethrough. In general, the first separator as shown in FIG. 3 indicated at 126 is generally adapted to have a high volume of diary flush water pass therethrough. For example, anywhere from 1000 to 4000 gal. per minute could go through the separator or several separators 126. The rotary separator 300 as shown in FIGS. 13 and 14 is well-suited for a lower total volumetric throughput but a high capture of solids where the thick fraction contains a higher percentage settleable solids than the input line.

As shown in FIG. 14, the rotary separator 300 comprises an input region 302 and an output region 304. Between the input and output regions 302 and 304 is a rotary separation area 306 and a drive mechanism 308. In one form, there are two rotary separation areas 306 placed in either end of the drive shaft 312 of the drive mechanism 308. Therefore, one of the separation areas will be described in detail with the understanding the description is relevant to the other separation area on the opposite side of the rotary separator 300.

In general, the drive mechanism 308 comprises a housing 310 and a central drive shaft 312. The drive shaft 312 is adapted to rotate at a set or variable rotational velocities with sufficient torque to rotate the rotary cones 316. The drive shaft 312 is coupled to the rotary cones 316 by a coupling mechanism 314. In the forward lateral portion of the coupling mechanism is an ejection nozzle 318 that is adapted to eject a solid/water mixture that in one form is received from the thickening tank(s) 180 as shown in previous figures. The ejected mixture from the line 320 (which is bifurcated and ejects a fluid solid mixture through the other portion 320') is immediately dispersed to the inner wall of a frustoconical shaped filter 322. The filter 322 in one form is a fabric type filter with a porosity adjusted to the type of solids that are to be found in the flush system of the dairy. The filter 322 has a longitudinal inward region 324 that is locked to the coupling mechanism 314 by way of bolts or other type of fastening dies for easy removal of the filter 322.

The filter 322 defines a frustoconical filter chamber 343 that is a general region in between the inward surface of the filter 322. The filter 322 has a longitudinal outward region 330 that has a wider diameter than the longitudinal inward region 324. Therefore, as the filter 322 rotates at a sufficient velocity (similar to the spin cycle in a conventional household clothes washing machine), the water is ejected through the solids region and through the porous portion of the filer 322 and is ejected through the thin fraction line 340. Because the inner surface of the filter 322 is frustoconical in nature the solid material tends to gravitate longitudinally outwardly in the direction indicated by arrow 342 and eventually reaches the outer perimeter region 344 and is ejected therefrom and eventually falls through the thick fraction outlet 346. Present analysis indicates that the thick fraction that is ejected through the thick fraction port 346 may be at a sufficiently high enough solid content that it may be manageable by way of machinery such as front loaders or the like. Alternatively, the thick fraction port 346 is in communication with either the solid storage location 134 such as that as shown in FIG. 3 or to a mixed tank 250 as shown in FIG. 9 or even an intermediate tank to adjust the solid content which is fed to a digester.

Therefore, the thin fraction line 340 and thick fraction line 346 comprise the output region 304 and the input line 320 comprises the input region 302. The outer casing shell 350 of the operating components of the rotary separator 300 are adapted to rest on a stand 352. As shown in FIG. 13, a longitudinally outward door 354 attached by a hinge 356 is adapted to encase the longitudinally outward chamber area 358. In the event that the thick fraction port 346 is clogged, the longitudinally outward door 354 can be opened to allow inspection of the chamber area 358 and clearing any clogging that may occur. It should be further noted that a water injection system can be employed 360 that comprises an input line 362. The input line 362 is adapted to flush water to the outside of the frustoconical filter chamber 343. The water ejected is adapted to clean out areas that may be clogged or otherwise used to facilitate the water removal from the influent coming through line 320. In other words, an addition of water may facilitate removal and separation of the solids whereby the excess water has a tendency to bias the solid material inwardly along the inner wall of the surface of the filter 322 and the added water is adapted to be ejected through the thin line fraction port 340.

The dimensions of the filter 322 can vary and are generally between two feet to six feet in diameter. The rotations per minute depend on various factors but are sufficient to advance the solids contained therein.

Of course modifications of the disclosed embodiments can be incorporated without departing from the spirit and scope of the present invention.

I claim:

1. A method for separating water from settleable solids and removal of a percentage of unsettleable solids from flush water in a dairy operation, the method comprising:
    a) retrieving a flush mixture from a diary to a first separator, placing a solids portion from the first separator to a first storage location,
    b) sending a fluid portion from the first separator to a process tank and inserting the fluid portion from the first separator into the processing tank where fluid is drawn from an upper portion of the process tank to flush a dairy where the vertical flow in the process tank is such that it does not exceed the mean settling rate of a settleable solids portion contained therein, where the fluid in the upper portion of the process tank is transferred back to the diary for the flushing in a partially closed loop system, c) intermittently ejecting the solids from the process tank in a bottom removal process and removing the settleable solids portion and an unsettleable solids portion therefrom the processing tank for transfer to a mix tank, d) a settleable solids portion and unsettleable solids portion from said mix tank is processed for further separation of the settleable solids in a second separator e) a thin fraction from the second separator is transferred to a settling tank intermittently ejecting the solids from the settling tank in a bottom removal process and removing a settleable solids portion and an unsettleable solids portion therefrom and transferring these portions to a second storage location.

2. The method as recited in claim 1 whereas intermittently ejecting the solids from the process tank in a bottom removal process to remove unsettleable solids to maintain a desirable level of unsettleable solids to flush the dairy.

3. The method as recited in claim 1 where a thick fraction from the second separator is transferred to the first storage location and the first and second storage locations are the same location and ejecting the solids from the settling tank in a bottom removal process and removing the settleable solids portion and the unsettleable solids portion to feed the digester to create a desired ratio of solids to liquid.

4. The method as recited in claim 1 the bottom removal of the process tank removes the high concentration of settleable solids region as well as a lower concentration of unsettleable solids region.

5. The method as recited in claim 4 where the bottom removal from the process tank is adapted to remove unsettleable solids therefrom so the percent of unsettleable solids in the partially closed loop system remains substantially in equilibrium.

6. The method as recited in claim 5 where the first storage location feeds a digester.

7. The method as recited in claim 6 where the fluid removed from the partially closed loop system from the process tank to mix tank is more than $\frac{1}{16}$ of the total amount of fluid contained within the partially closed loop system per day.

8. The method as recited in claim 7 where the fluid from the process tank is transferred to the mix tank by hydrostatic pressure within the process tank.

9. The method as recited in claim 1 where the first storage location feeds a digester.

10. The method as recited in claim 1 where the settleable material in the process tank is allowed to settle for more than 20 minutes prior to being ejected to the mix tank.

11. The method as recited in claim 1 where the bottom removal process is adapted to be extracted by a grid having a plurality of laterally extending members.

12. The method as recited in claim 11 whereby mix tank is adapted to receive the settleable solids portion and the unsettleable solids portion from the processing tank in a batch manner and the mix tank provides capacitance to not over feed the second separator.

13. The method as recited in claim 12 whereby a thick fraction from the second separator is transferred to the first storage location and the first and second storage locations are the same location and ejecting the solids from the settling tank in a bottom removal process and removing the settleable solids portion and the unsettleable solids portion are used to create a desired ratio of solids to liquid to feed a digester.

14. The method as recited in claim 1 where a solids portion from the second separator is transferred to the first storage location.

15. The method as recited in claim 1 where after the portion of settleable solids and unsettleable solids from the processing tank has sufficiently settled within the settling tank, the upper portion of the settling tank contains a lower percentage of unsettleable solids than the lower portion of the settling tank.

16. The method as recited in claim 1 where the fluid removed from the partially closed loop system from the process tank to mix tank is more then $\frac{1}{16}$ of the total amount of fluid contained within the partially closed loop system per day.

17. The method as recited in claim 1 where the fluid removed from the partially closed loop system from the process tank to the mix tank is more then $\frac{1}{10}$ of the total amount of fluid contained within the partially closed loop system per day.

18. The method as recited in claim 1 where the fluid from mix tank is transferred to the second separator where a thin fraction is transferred to long term storage and the thick fraction is transferred to the first storage location.

19. The method as recited in claim 1 where the fluid from the process tank is transferred to the mix tank by hydrostatic pressure within the process tank.

20. A fluid and solid separator system for a dairy having a flushing system with flush water having unsettleable and settleable solids therein, the flush system comprising:

a) a first separator adapted to remove settleable solids from returning flush water whereas the first separator has a first ejection port to deposit a thick fraction of the flush water to a first storage location and a second ejection port adapted to deposit a thin fraction of the flush water to a process tank, b) a process tank adapted to receive the thin fraction of the flush water from the first separator where the process tank comprises:

i an ejection port for adapted to eject a second thin fraction of the flush water that is positioned in the upper one half portion of the process tank, ii a flush water feed line that is in communication with the flushing system of the dairy to form a partially closed loop system, iii the process tank having a cross-sectional diameter allowing a vertical flow rate of the fluid contained therein that is less than the settling rate of the settleable solids, iv a bottom removal grid adapted to remove discharge fluid comprising settleable and unsettleable solids contained in the discharge fluid in the lower portion of the process tank, c) a mix tank in communication with the process tank whereas the mix tank is adapted to be filled in a batch process from the bottom removal grid of the process tank to pass effluent thereto, d) a second separator in communication with the mix tank to receive the effluent from the mix tank.

21. The fluid and solid separator system as recited in claim 20 whereas a thin fraction of the second separator is transferred to settling tank intermittently ejecting the solids from the settling tank in a bottom removal process and removing a settleable solids portion and an unsettleable solids portion therefrom and transferring a percentage of these portions to the first storage location to adjust the ratio of solid to water to feed a digester.

22. The fluid and solid separator system as recited in claim 20 whereby a thick fraction of the first separator and a thick fraction of the second separator is operatively configured to be transferred a digester.

23. The fluid and solid separator system as recited in claim 22 whereby the digester receives solid content of at least 12% by weight with respect to the water.

24. The fluid and solid separator system as recited in claim 20 where the thick fractions of the first separator and a thick fraction of the second separator both feed a digester.

25. The fluid and solid separator system as recited in claim 24 where a thin fraction to the second separator feeds a settling tank and a thick fraction of the settling tank is adapted to dilute the thick fractions from the first and second separators to provide a predefined ratio of solids to feed the digester.

26. The fluid and solid separator system as recited in claim 25 the flush water entering the dairy is between 0.8% and 1.5% of unsettleable solids by weight with respect to the water.

27. The fluid and solid separator system as recited in claim 20 the flush water entering the dairy is between 0.8% and 1.5% of unsettleable solids by weight with respect to the water.

28. A method for separating water from settleable solids and removal of a percentage of unsettleable solids from flush water in a dairy operation, the method comprising:
   a) retrieving a flush mixture from a diary to a first separator,
   b) placing the thick fraction from the first separator to a first storage location,
   c) sending the thin fraction from the first separator to a process tank and injecting the thin fraction from the first separator in the lower region of the processing tank where fluid onctained in the processing tank is drawn from the upper portion of the process tank to flush a diary to form a partially closed loop system, whereas the vertical flow in the process tank is such that it does not exceed the mean settling rate of the settleable solids contained therein, where the portion of fluid in the upper region of the process tank is transferred back to the diary for the flushing,
   d) allowing the settleable solids to settle and ejecting the settled solids from the process tank in a bottom removal process and removing a portion of unsettleable solids in the concentration of unsettleable solids region of the process tank therefrom the processing tank for transfer to a mix tank,
   e) transferring the contents of the mix tank to a second separator,
   f) whereas the unsettleable solids in the partially closed loop system remain substantially in equilibrium below 2% unsettled solids by weight with respect to water.

29. The method as recited in claim 28 where a thick fraction from the second separator is transferred to the first storage location and the first and second storage locations are the same location and ejecting the solids from the settling tank in a bottom removal process and removing the settleable solids portion and the unsettleable solids portion to feed the digester to create a desired ratio of solids to liquid.

30. The method as recited in claim 28 where the first storage location feeds a digester.

31. The method as recited in claim 28 where the settleable solids in the process tank is allowed to settle for more than 20 minutes prior to being ejected to the mix tank.

* * * * *